United States Patent [19]

Johnson

[11] 3,996,654
[45] Dec. 14, 1976

[54] METHOD OF MAKING SYNTATIC MODULES

[75] Inventor: Arne I. Johnson, Springfield, Mass.

[73] Assignee: Albany International Corporation, Albany, N.Y.

[22] Filed: Aug. 5, 1975

[21] Appl. No.: 601,983

Related U.S. Application Data

[62] Division of Ser. No. 516,165, Oct. 21, 1974, abandoned.

[52] U.S. Cl. .................................. 29/458; 9/8 R; 29/463; 29/DIG. 46; 138/149; 264/46.9
[51] Int. Cl.² ...................... B23P 3/00; B23P 25/00
[58] Field of Search ..... 29/458, 455, 463, DIG. 46; 9/8 R, 8.5; 138/149; 264/DIG. 6, 46.9

[56] References Cited

UNITED STATES PATENTS

| | | | |
|---|---|---|---|
| 2,985,411 | 5/1961 | Madden | 29/DIG. 46 UX |
| 3,258,511 | 6/1966 | McGregor | 29/463 UX |
| 3,353,981 | 11/1967 | Jacob | 264/DIG. 6 UX |
| 3,622,437 | 11/1971 | Hobaica | 9/8 R X |
| 3,705,432 | 12/1972 | Watkins | 9/8 R |
| 3,729,756 | 5/1973 | Cook | 9/8 R |
| 3,763,548 | 10/1973 | Anderson | 264/46.9 X |

*Primary Examiner*—Charlie T. Moon

[57] ABSTRACT

An improved method of making syntatic modules is provided. The method includes the steps of forming a mold and adhering an expanded honeycomb material to the interior surface of the mold. The mold is then closed at one end and filled with hollow, plastic spheres from the other end. After the spheres are in place, a syntatic foam is pumped into the mold from the bottom, filling all spaces between the balls with the foam. The foam is then permitted to set after which the mold is removed, leaving the desired module. Thereafter, a skin may be applied to the module.

1 Claim, 9 Drawing Figures

METHOD OF MAKING SYNTATIC MODULES

This is a division of application Ser. No.516,165, filed Oct. 21, 1974, now abandoned.

BACKGROUND OF THE INVENTION

The present invention relates to an improved molding method and in particular to a method of making syntatic modules.

In U.S. Pat. No. 3,622,437 there is disclosed a composite buoyancy material for use in a variety of underwater environments. The material in that patent is disclosed as a syntatic foam filled with a plurality of hollow spheres or beads.

It is the principal object of the present invention to disclose an improved method of making syntatic modules. Such modules may, for example, be in the form of jackets to be secured to the outside of pipes, drill sections, or the like for use at offshore oil installations or in other deep sea locations to render the same buoyant.

SUMMARY OF THE INVENTION

The above and other beneficial objects and advantages are attained in accordance with the present invention by providing an improved method of making syntatic modules which includes the steps of forming a hollow mole comprising male and female parts together having a cavity of the desired module configuration. A thin skin of an uncured plastic resin is applied to the interior surfaces of the mold parts and cured. While the skin is still tacky (not completely cured) a layer of honeycomb material of prescribed thickness and cell size is applied to the skin. The mold is then closed and filled with a plurality of hollow plastic balls after which the syntatic foam material is pumped into the mold from the bottom thus causing the plastic balls to be embedded within a syntatic foam matrix. After the syntatic foam cures the mold is removed leaving the syntatic module. A tough outer skin, such as a fiber glass reinforced polyester resin may be applied to the module after it cures to protect the outer surface.

DETAILED DESCRIPTION OF THE PREFERRED EMBODIMENT

Figure 1:
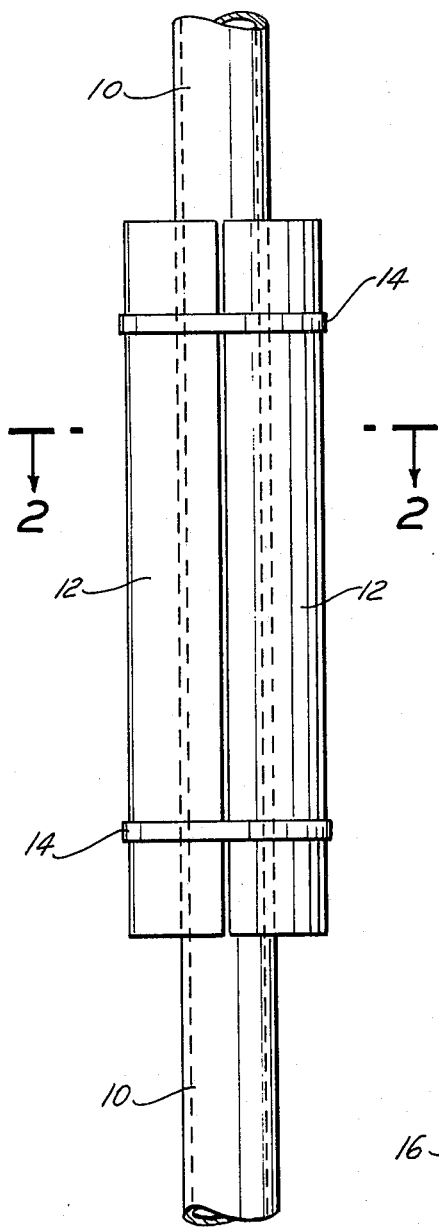
FIG. 1 is a side elevational view of a section of pipe or the like encased in a syntatic module formed in accordance with the present invention.
Figure 2:
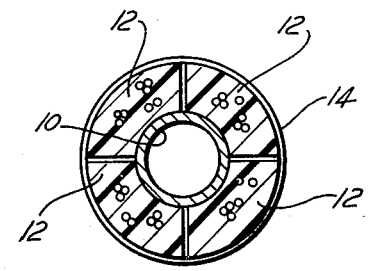
FIG. 2 is a sectional view taken along reference lines 2—2 of FIG. 1 in the direction indicated by the arrows.
Figure 3:
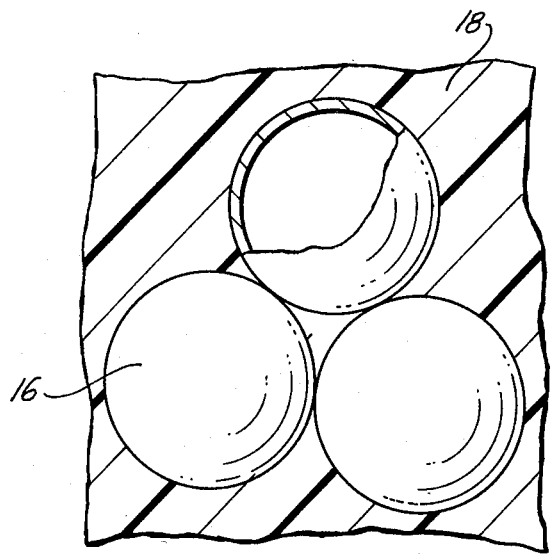
FIG. 3 is an enlarged fragmentary view of the syntatic material.
Figure 4:
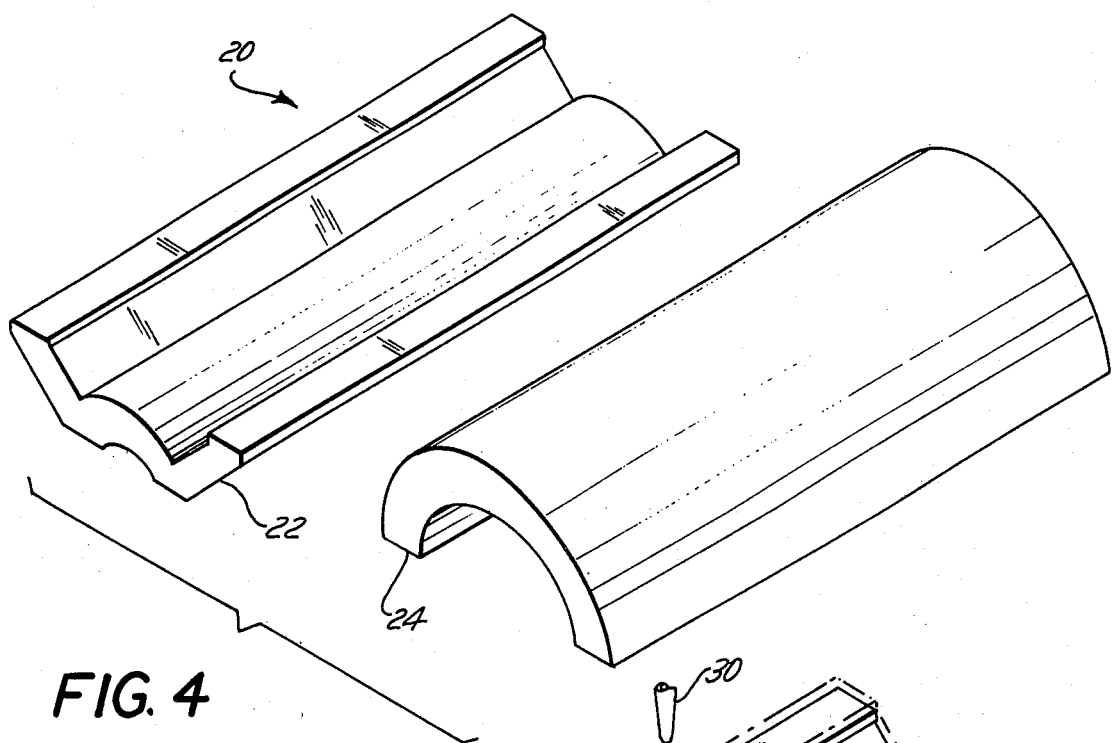
FIG. 4 is a perspective view of a pair of male and female patterns utilized to form molds for the syntatic module.

The present invention is illustrated in the accompanying drawings wherein similar components bear the same reference numeral throughout the several views. In FIG. 1 there is shown a pipe 10 or the like encased within a jacket formed of a plurality of syntatic modules 12 held together by bands 14. The modules could comprise 90° sections as shown in FIG. 2 or could be of varied arc length up to 180°. The jacket serves to render the pipe buoyant notwithstanding the great weight of the pipe and the extreme pressures to which the pipe may be subjected in deep sea environments. The jacket is formed of buoyant material and, as shown in FIG. 3, comprises a plurality of hollow spheres 16 embedded in a matrix of syntatic foam 18 such as that disclosed in U.S. Pat. No. 3,622,437.

The steps performed in forming the modules 12 are illustrated in FIGS. 4 through 8. Accordingly, as a first step a pattern 20 having a male section 22 and female section 24 are used to form molds of fiber glass or other similar materials. If desired, the pattern sections may be provided with an inside surface of Formica or the like to give a smoother surface to the molds.

Figure 5:
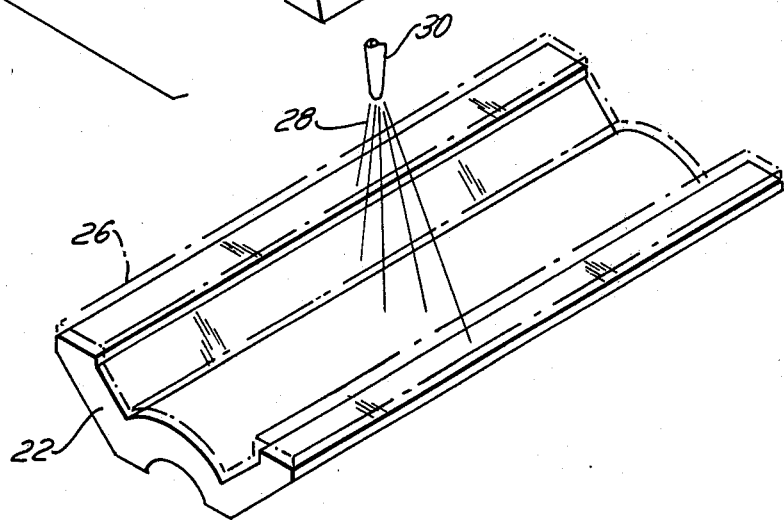
FIG. 5 is a perspective diagrammatic view of the manner by which the molds are formed.
Figure 6:
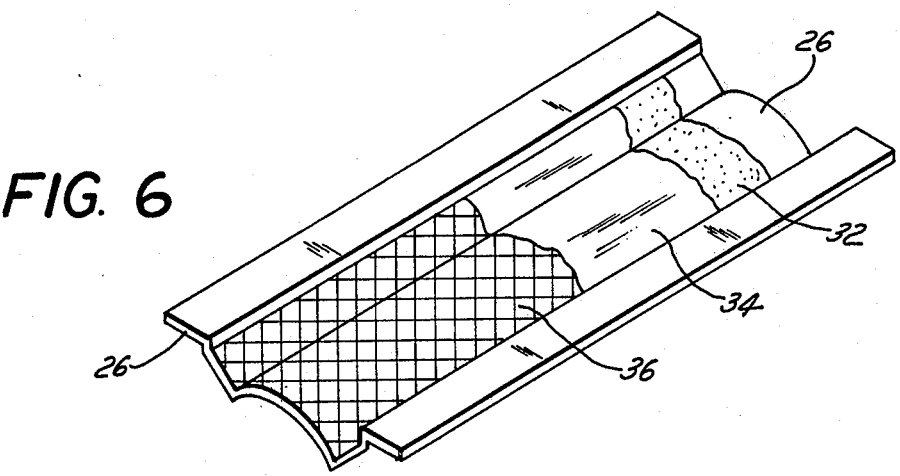
FIG. 6 is a perspective view depicting the initial steps in accordance with the present method.
Figure 7:
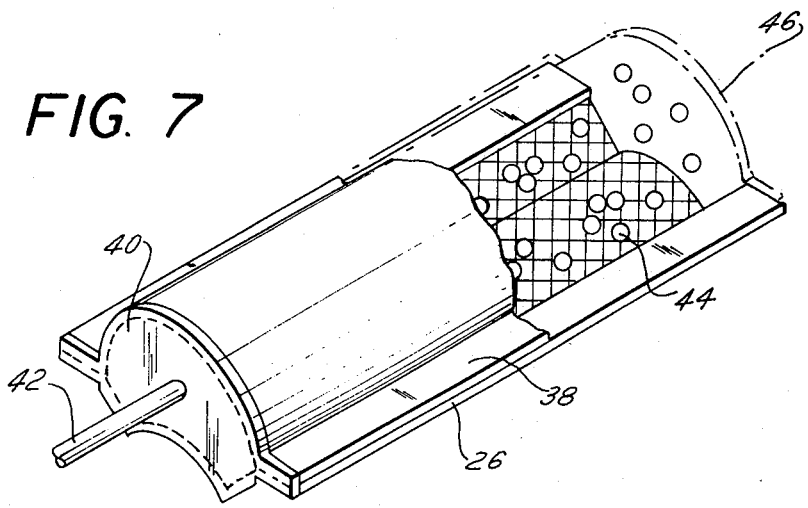
FIG. 7 is a perspective view depicting the manner by which a plurality of hollow balls are introduced into the mold cavity to produce a syntatic module in accordance with the present invention.
Figure 8:
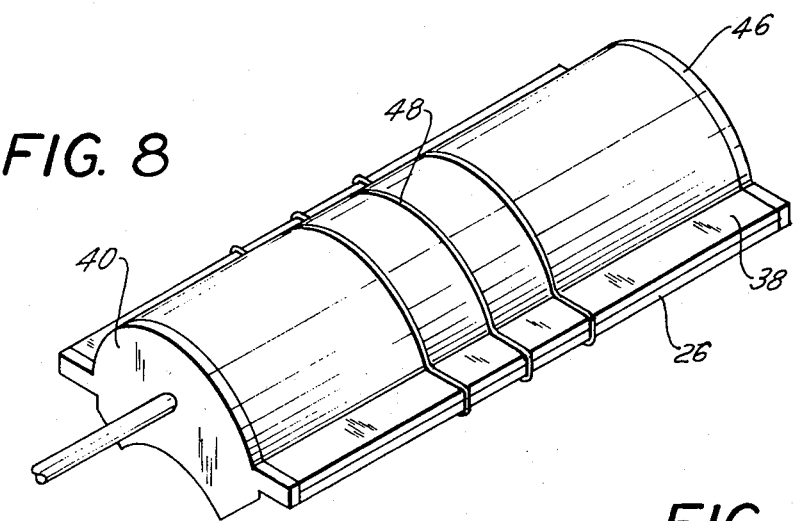
FIG. 8 is a perspective view similar to FIG. 7 depicting the manner by which the syntatic resin is introduced into the mold cavity.
Figure 9:
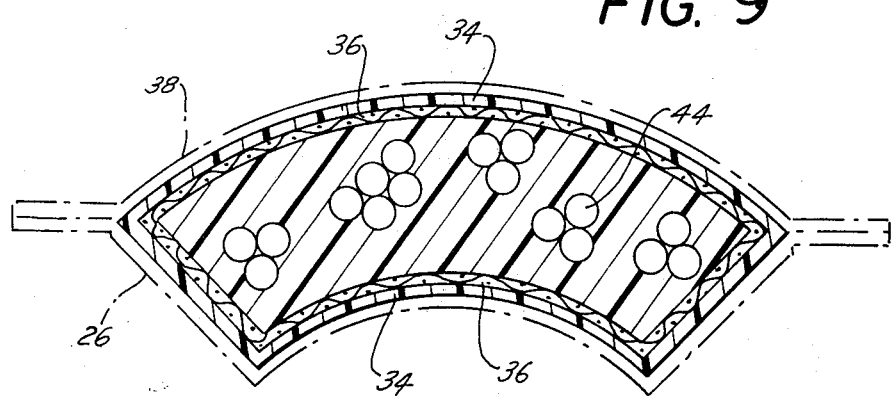
FIG. 9 is a sectional view of a syntatic module in accordance with the present invention similar to FIG. 2 but containing more detail.

As shown in FIG. 5, (wherein only the male section 22 of the pattern is depicted) a fiber glass mold section 26 is formed by spraying a ⅛ inch layer of fiber glass 28 on the inside surface of the pattern through appropriate spray means 30. It has been found that the spraying must be done in two or three stages to form the mold sections. The sprayed fiber glass is then allowed to cure after which the mold section is removed from the pattern so that the pattern may be reused.

After the mold sections are cured, a release agent 32 is applied to the inside surface of the mold by spraying, wiping, painting, etc. Thereafter, a thin skin 34 of plastic resin is formed on the inside of the mold over the release agent. The plastic resin is permitted to cure and while still tacky (i.e., not completely cured) a layer of expanded honeycomb material 36 is pressed against the skin and bonded to the skin by the subsequent complete curing of the resin. The honeycomb may be of any material compatible with syntatic foam and suitable for the intended environment.

In the same manner as described above, a female mold section 38 is formed and the male and female sections 26 and 38 are then closed and a bottom plate 40 having an inlet manifold 42 is attached to the lower end of the mold. The composite hollow mold is then placed at a slight angle or straight-up while a plurality of hollow spheres or balls 44 are poured into the mold from the open top end. While the balls are poured into the mold, it has been found beneficial to vibrate the mold in order to settle a maximum number of balls within the mold cavity.

After the mold is filled with the balls, a top end plate 46 is attached to the open top end of the mold whereafter a syntatic foam made up of glass micro balloons, epoxy resins, and a catalyst hardner is pumped through the bottom plate manifold until the mold is completely full. It has been found that a restraining cage 48 may be applied around the mold to prevent warpage of the molds during the pumping process. The syntatic foam is pumped through the bottom plate until the mold is completely full including all spaces between adjacent balls as well as the cells of the honeycomb. The pumping is performed under pressure from the bottom of the upright mold allowing complete dissemination of the foam material up and around all the balls. This helps to prevent voids which are created when pouring is conducted from the top of the mold relying on gravity to pull the viscous material into the voids around and under the balls.

After the mold cavity is filled with the syntatic foam, a vent in the top end plate 46 is plugged and the pump removed from the bottom manifold 42 and the manifold orifice plugged. Thereafter, the modules are allowed to cure after which they are removed from the mold resulting in a module of the desired shape.

As a final step, a tough outer skin may be applied to the module. The skin serves to protect the module from abrasions and impact when the module is handled. The skin could, for example, comprise a combination of chopped fiber glass and a polyester resin. Since the skin coat does not have the buoyancy of the syntatic foam, it is desirable to keep the skin as thin as practical so as not to reduce the floatation properties of the module. A skin on the order of 0.080 inch was satisfactory.

Thus, in accordance with the above, the aforementioned objects and advantages are effectively attained.

Having thus described the invention, what is claimed is:

1. The method of providing a pipe member with syntatic modules as flotation devices comprising the steps of:
   a. forming a hollow mold having surfaces defining a cavity including an arcuately convex surface for forming one of said modules with an arcuately concave surface thereof;
   b. applying a layer of spacer material containing a plurality of voids to the surfaces of said mold;
   c. filling said mold with a plurality of hollow balls;
   d. adding a syntatic foam resin into said mold interior so as to fill all spaces between said balls and all voids in said spacer material;
   e. curing said syntatic foam resin and removing said mold parts whereby to produce said module;
   f. applying a tough outer skin to said module;
   g. repeating steps b thru f to produce additional like modules; and
   h. assembling said modules as segments around said pipe with the concave surfaces of said modules adjacent said pipe.

* * * * *